May 13, 1958  F. SCHAUB  2,834,119

CONTACTING OF GRANULAR MATERIALS WITH GASES

Filed Dec. 12, 1951

INVENTOR
Franz Schaub
BY Burgess + Dinklage
ATTORNEY

United States Patent Office 2,834,119
Patented May 13, 1958

2,834,119

CONTACTING OF GRANULAR MATERIALS WITH GASES

Franz Schaub, Oberhausen-Holten, Germany, assignor to Ruhrchemie Aktiengesellschaft, Oberhausen-Holten, Germany, a German corporation Application December 12, 1951, Serial No. 261,191

Claims priority, application Germany December 16, 1950

13 Claims. (Cl. 34—25)

This invention relates to improvements in the contacting of granular material with gases.

Many processes are known in which granular solid materials and gases are contacted, as, for example, in the treatment and reaction of granular substances with gases.

A process for this contacting has been suggested in which the granular material is allowed to pass downward over surfaces which are permeable to gas, such as grid surfaces. The gases are blown through the openings or slots of the gas-permeable surfaces or grids into contact with the solid materials being treated. The velocity of the upwardly flowing gas stream is preferably maintained at a velocity sufficiently high so that the upward lifting force of the gases on the solid materials substantially reduces or cancels the downward pressure of the granular material on the surfaces.

This suggested method is far more efficient than any previously known. However, the material does not generally flow at a constant velocity at all points over the gas-permeable surfaces. The velocity of the downward moving granular material generally increases considerably in a lateral direction toward the discharge opening. Due to this, as uniform a treatment of the downwardly moving stream of granular material with the gases as may be desired is not obtained.

Figure 1:
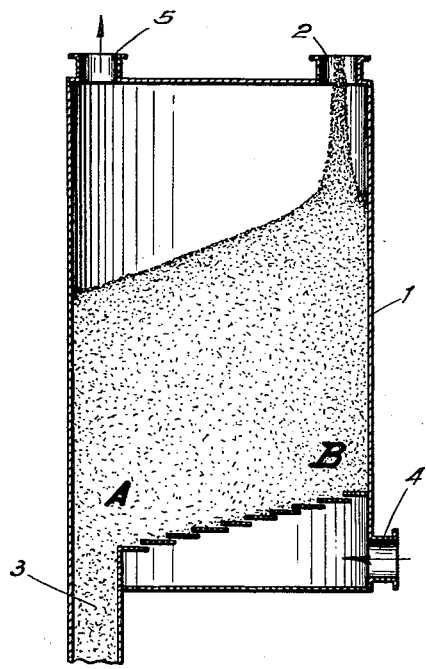

One object of this invention is to obtain a uniform treatment of the solid materials with the gases in the above-mentioned method. This, and still further objects will become apparent from the following description read in conjunction with the drawings in which:

Fig. 1 diagrammatically shows a vertical cross-section of an apparatus for effecting the improvement in accordance with the invention.

Figure 3:
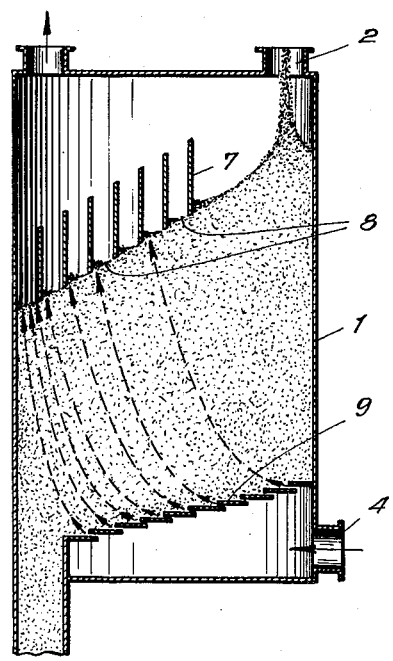
Figure 2:
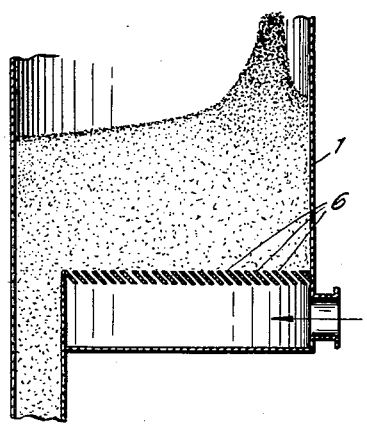
Figure 4:
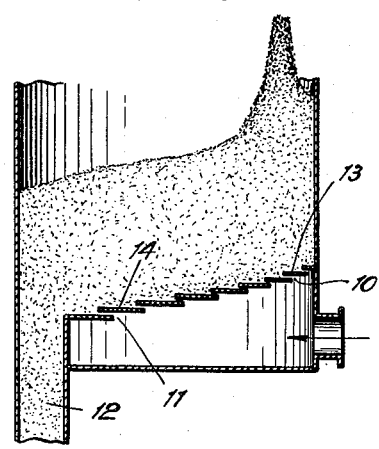

Fig. 2 shows another embodiment for effecting the improvement with a different type of grid false bottom;

Fig. 3 diagrammatically shows a vertical cross-section of an apparatus in accordance with the invention with additional guide plates; and Fig. 4 diagrammatically shows a cross-section of an apparatus with still a different type of grid plate arrangement in accordance with the invention.

It has now been found that in the method of contacting granular material with gases in which the granular material is passed downwardly over a gas-permeable surface and gases are blown through the openings or slots of the gas-permeable surfaces in contact with the granular materials, a uniform treatment of the downwardly travelling stream of material may be obtained by regulating the upwardly flowing gas stream so that the gases are conducted through the layer of material at a higher rate of flow at the places of high velocity of material than at the places of low velocity of material. Thus, in normal operation, the upward-flowing gas stream will be conducted through the layer of material at a higher rate of flow above the discharge opening and at a lower rate of flow below the material inlet.

The upward-flowing gas stream may be regulated to pass through the layer of material at a rate increasing with the velocity of material in many different ways. Thus, for example, the layer height of the material above the gas-permeable surface may be controlled so that it is highest at the point where the velocity of the material is lowest and lowest at the point where the velocity of the material is highest. As the resistance to the rising gas is dependent to a certain extent on the height of the material, the resistance will be lowest at the place of greatest velocity of the material and highest at the place of lowest velocity of the material. As the velocity gas flow is dependent upon the resistance, the flow of gases will be relatively high through the material travelling at a high velocity and relatively low through the material travelling at a low velocity. This desirable control of the layer height of the material may be effected, for example, by having the inclination of the gas-permeable or grid surfaces which support the material so small that the layer depth of the material is smallest in the zone of discharge and consequently in the zone of highest velocity of the material. At the points of the relatively lowest velocity of the material the greatest layer depth will be formed and consequently the velocity of the gases flowing therethrough will be correspondingly reduced.

In order to obtain the small slope of the gas-permeable surfaces required, and, for example, the gas-permeable surfaces are defined by individual spaced-apart grid plates, these may be arranged horizontally with a very small vertical difference between each plate and the next adjacent plate. In this case it is also possible to tilt the individual plates in an upward direction and even have all the plates positioned in a horizontal plane.

Another method of controlling the layer height of the granular material above the gas-permeable surface in the desired manner, is to arrange guide plates near the surface of the downwardly travelling granular material which will positively cause the layer height of the material to decrease in the direction of the material outlet in steps. The average inclination of the step-wise decrease of this surface with the use of guide plates must be greater than the inclination of the gas-permeable surface over which the material flows.

The velocity of the gases passing through the material layer may also be controlled in the desirable manner by controlling the sizes of the openings or slots of the gas-permeable surfaces or grids. Thus, the openings in the gas-permeaable surfaces or grids should be increased at the places at which the greatest flow velocity of the gas through the granular material is desired. This method of operation is specially advantageous if the flow resistance through the material layer is not substantially greater than the resistance which arises at the gas exit cross-sections. It is also possible when using grid plates, to vary the width of the individual plates. This may be done along with or independent of the variation in the size of the openings in the gas-permeable surfaces. In the normal case the gas-permeable openings or slot sizes and/or the plate widths should be increased in the direction of the flow of material toward the discharge opening. The change in the grid plate widths and the gas-permeable openings may be used to influence the inclination of the grid in the manner desired.

The new improvement will be more fully explained with reference to the accompanying drawings, which show several embodiments of apparatuses for effecting the same.

The treating vessels or containers 1 are conventional containers for the contacting of solid granular materials and gases in the manner described and may be of any desired cross-section. Thus, the vessels may be cylindrical or preferably rectangular. The granular material is passed in from above through the inlet pipe 2. Within the container 1 the material will accumulate on the gas-permeable surface shown as a grid-type false bottom. Gas is passed through the gas inlet pipe 4 and passes between the openings in the gas-permeable surfaces, in this case between the slots of the grid plates and through, in contact with the granular material. After a sufficient contacting of the gases, the material is discharged through a discharge pipe 3. The treating gases which enter below the gas-permeable surfaces through the gas inlet pipe 4, leave the treating vessel of the upper end through a tubular nozzle 5.

In the embodiment shown in Fig. 1, the gas-permeable surface is defined by individual spaced-apart grid plates which are horizontally disposed and arranged in the form of steps in such a manner that the surface formed by them has a relatively small inclination. At the points "A" the velocity of the material is highest and the resistance to the gas flow is smallest. At the point "B" the velocity of the moving material is low and the resistance to the passage of gas therethrough is greatest. Thus the treating gas velocity at "A" will be greatest and at "B" will be smallest.

In the embodiment illustrated in Fig. 2, the gas-permeable surface is defined by multiple grid rods 6 positioned in a horizontal plane. The rods are arranged in close succession and are inclined upwardly in the direction of the gas stream.

In the embodiment shown in Fig. 3, guide plates 7 are arranged near the material surface, the lower edges of which contact the material layer and are arranged in such a way that their level height in the container gradually decreases in the direction of the material discharged. In this way the surface of the material in the container 1 will be forced by the guide plates 7 to take the form of steps. The individual guide plates must be located with their lower edges in such a way that the mean inclination of the upper material surface 8 is greater than the inclination of the surface defined by the individual grid plates 9. In the embodiment shown in Fig. 4 the gas-permeable surface is defined by grid plates positioned so that the individual slot widths therebetween are of different sizes. The slot 10, located near the material entering, is relatively narrower than the slot 11 positioned near the material discharge opening. In addition, the width of the individual plates 13 is smaller than that of the plates 14 which are located near the material discharge. The slot widths may be gradually increased in the direction of the material discharge without an increase in the width of the individual grid plates. In this connection, the grid surface is defined by individual grid plates of equal width. It is also possible to increase the width of the individual grid plates without simultaneously increasing the slot widths.

As an illustration of how the slot widths may be increased in a grid consisting of 17 individual plates, and having 16 slots, the two uppermost slots may have a width of 3 mm., the next following three slots in the downward direction, 6 mm., followed by three slots of 9 mm., followed by three slots of 12 mm., and finally, near the material discharge, by four slots of 15 mm.

In addition to the variation of the slot widths and plate widths in accordance with the invention, the inclination of the individual successive grid plates may also be varied. Below the material entry grid plates may be used, for example, with an inclination which is greater than that of the grid plates which are positioned near the material discharge and may be disposed practically horizontally.

Although in the drawings the gas-permeable surfaces defining the false bottom are shown in the form of grid plates or grid bars, it is, of course possible in accordance with the invention, to use any known methods for the defining of a downward surface for granular materials which will allow the passage of gas therethrough. Such devices such as grids, screens, brakes, plates, etc. will be referred to in the claims as grid means which is generically intended to cover all such means.

The velocity of the gases flowing through the granular solids may be increased by means of the method according to the invention by 20–50 percent towards the material discharge. Below the material entry (2) the layer depth of the material travelling down the grid plate may be approximately 10–30 percent higher than above the material discharge (3). The angle of inclination of the grid plate (9) over which the material travels down is always smaller than the so-called angle repose of the material being treated and attains in the maximum 90 percent of this angle of repose.

The method and apparatus according to the invention is applicable to various processes in which granular materials are treated with gases, such as heating, drying, cooling, aerating, dusting, or oxidising of minerals, salts, coal, fertilizers, dyestuffs, oil seeds, grains, bruised grain, fruit, vegetables, sliced vegetables, sliced potatoes, malt, seed-corns, wood, plastic or metal shavings. The process according to the invention is also applicable to burning, roasting or sintering of minerals, cement, gypsum, or lime. It may also be applied to the addition of gases to solids, such as the addition of ammonia to phosphatic fertilizers or of nitrogen to calcium carbide. Moreover, absorption processes or gas purifications may be carried out by means of the process according to the invention, such as the desulfurization of gases by means of granular desulfurizing materials, the removal of carbon dioxide from gas mixtures by means of granular calcium oxide, or the filtration and purification of gases by means of granular materials or activated materials by which dustlike materials are retained.

I claim:

1. In the method for the contacting of granular materials with gases in which a granular material is substantially continuously passed downwardly in the form of a contiguous body over an inclined gas-permeable surface and a gas is substantially continuously passed upwardly through the gas-permeable surface in counter-current contact with the granular material, the granular material having a higher flow velocity at the lower portion of the inclined surface than at the upper portion thereof, the improvement which comprises substantially continuously controlling the flow velocity of the upwardly flowing gas so that the same moves at a higher flow velocity at the places of higher flow velocity of the granular material and at a lower flow velocity at the places of lower flow velocity of the granular material, by passing the gas through the gas-permeable surface at a velocity to substantially reduce the downward pressure of the granular material on the surface without causing substantial eddying thereof and in which the flow velocity of the gas through the granular material is controlled by maintaining a lower layer height of granular material at the place of higher granular material flow velocity than at the place of lower granular material flow velocity.

2. Improvement according to claim 1, in which a lower layer height of granular material is maintained at the place of higher granular material flow velocity than at the place of lower granular material flow velocity by maintaining the gas permeable surface at an angle of inclination smaller than the minimum angle required for the flow of the granular material thereover.

3. In the method for the contacting of granular material with gas in which the granular material is substantially continuously passed downwardly over an inclined gas-permeable surface in the form of a substantially contiguous body of appreciable layer height, and gas is substantially continuously passed upwardly through the gas-permeable surface in countercurrent contact with the granular material, the granular material having a higher flow velocity at the lower portion of the inclined surface than at the upper portion thereof, the improvement which comprises maintaining a lower layer height of granular material at the place of higher flow velocity granular material than at the place of lower flow velocity of granular material so that the upwardly passing gas will have a higher flow velocity at the place of higher flow velocity granular material than at the place of lower flow velocity granular material.

4. Improvement according to claim 3, in which a lower layer height of granular material is maintained at the place of higher flow velocity granular material than at the place of lower flow velocity granular material by maintaining said gas-permeable surface at an angle of inclination smaller than the minimum angle required for the flow of granular material thereover.

5. Apparatus for the continuous contacting of solid granular materials with gases, which comprises means defining a container having a granular material inlet pipe and a gas outlet pipe at substantially opposite peripheral portions of the upper portion thereof, a granular material discharge opening defined in the lower portion of said container, a gas inlet pipe positioned in the lower portion of said container, grid means positioned above said gas inlet pipe extending substantially entirely across said container and substantially uniformly inclined toward said discharge opening.

6. Apparatus for the continuous contacting of solid granular materials with gases, which comprises means defining a container having a granular material inlet pipe and a gas outlet pipe at the upper portion thereof, a granular material discharge opening defined in the lower portion of said container, a gas inlet pipe positioned in the lower portion of said container, grid means positioned above said gas inlet pipe and inclined toward said discharge opening and a multiple number of guide plates positioned in said container for limiting the upper surface of layers of granular material passing therethrough at an angle of inclination greater than the angle of said grid means.

7. Apparatus for the continuous contacting of granular material with gases, which comprises means defining a container having a granular material inlet pipe and gas exit pipe at the upper portion thereof, a granular material discharge opening defined at the lower portion thereof, the gas inlet pipe positioned at the lower portion of said container substantially opposite said discharge opening, grid means defined by multiple spaced-apart grid rods defining a false bottom for granular material at the lower portion of said container above said gas inlet pipe to said discharge opening, and multiple gas passage openings defined between said grid rods in an upward direction in said container.

8. Apparatus for the continuous contacting of granular materials with gases, which comprises means defining a container having a granular material inlet pipe and a gas outlet pipe at the upper portion thereof, a granular material discharge opening defined at the lower portion thereof, a gas inlet pipe positioned at the lower portion of said container, and grid means positioned above said gas inlet pipe and defining an inclined surface for the passage of granular material thereover to said discharge opening, said grid means being defined by multiple spaced-apart grid plates, said grid plates increasing in width toward said discharge opening.

9. Apparatus according to claim 8, in which said grid plates define therebetween gas passages of increasing size in the direction of said discharge opening.

10. Apparatus for the continuous contacting of granular material with gases which comprises means defining a container having a granular material inlet pipe and a gas exit pipe at the upper portion thereof, a granular material discharge opening defined at the lower portion thereof, a gas inlet pipe positioned at the lower portion of said container, grid means defining an inclined surface for granular material toward said discharge opening above said gas inlet pipe, said grid means being defined by multiple individual grid plates positioned in spaced-apart relationship to define gas openings therebetween of an increasing size in the direction of said discharge opening.

11. Apparatus according to claim 10, in which said grid plates increase in width in the direction toward said discharge opening.

12. Apparatus for the continuous contacting of granular materials with gases, which comprises means defining a container having a granular material inlet pipe and a gas discharge pipe at the upper portion thereof, a granular material discharge opening defined at the lower portion thereof, a gas inlet pipe positioned at the lower portion of said container, grid means defining an inclined surface for granular material toward said discharge opening positioned above said gas inlet pipe, said grid means being defined by multiple spaced-apart grid plates, said grid plates being positioned at decreasing vertical angles of inclination in the direction toward said discharge opening.

13. Apparatus according to claim 12, in which the grid plates immediately adjacent to said discharge opening are horizontally positioned.

References Cited in the file of this patent

UNITED STATES PATENTS

| | | |
|---|---|---|
| 1,836,301 | Bechthold | Dec. 15, 1931 |
| 1,895,601 | Beuthner | Jan. 31, 1933 |
| 2,202,258 | Lynch | May 28, 1940 |
| 2,444,128 | Anderson | June 29, 1948 |

FOREIGN PATENTS

| | | |
|---|---|---|
| 110,235 | Great Britain | Oct. 18, 1917 |
| 360,547 | Great Britain | Nov. 12, 1931 |
| 498,587 | Belgium | Apr. 9, 1951 |
| 501,224 | Belgium | Aug. 13, 1951 |